United States Patent
Dekel et al.

(10) Patent No.: US 9,888,032 B2
(45) Date of Patent: Feb. 6, 2018

(54) METHOD AND SYSTEM FOR MITIGATING THE EFFECTS OF RANSOMWARE

(71) Applicant: CHECK POINT SOFTWARE TECHNOLOGIES LTD., Tel Aviv (IL)

(72) Inventors: Kasif Dekel, Bat-Yam (IL); Liad Mizrachi, Petah-Tikva (IL); Roman Zaikin, Ashkelon (IL); Oded Vanunu, Rishon-Le-Zion (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 15/144,847

(22) Filed: May 3, 2016

(65) Prior Publication Data

US 2017/0324755 A1    Nov. 9, 2017

(51) Int. Cl.
*H04L 29/06*    (2006.01)
*G06F 21/60*    (2013.01)

(52) U.S. Cl.
CPC .......... *H04L 63/145* (2013.01); *G06F 21/60* (2013.01)

(58) Field of Classification Search
CPC ................................. H04L 63/145; G06F 21/60
See application file for complete search history.

(56) References Cited

U.S. PATENT DOCUMENTS

| | | | | |
|---|---|---|---|---|
| 8,458,797 | B1* | 6/2013 | Yu | G06F 21/566 709/223 |
| 9,009,829 | B2* | 4/2015 | Stolfo | G06F 21/554 726/23 |
| 9,514,309 | B1* | 12/2016 | Mann | G06F 21/60 |
| 9,807,115 | B2* | 10/2017 | Kolton | H04L 63/145 |
| 2007/0283435 | A1* | 12/2007 | Cohen | G06F 21/554 726/22 |
| 2011/0023118 | A1* | 1/2011 | Wright | G06F 11/28 726/23 |
| 2011/0307705 | A1* | 12/2011 | Fielder | G06F 21/62 713/181 |
| 2013/0007729 | A1* | 1/2013 | Sirotkin | G06F 9/4445 718/1 |
| 2013/0067576 | A1* | 3/2013 | Niemela | G06F 21/568 726/24 |
| 2015/0058987 | A1* | 2/2015 | Thure | G06F 21/554 726/23 |
| 2016/0180087 | A1* | 6/2016 | Edwards | G06F 21/568 726/24 |

(Continued)

OTHER PUBLICATIONS

"Cryptolocker using Powershell as a tripwire" a reddit.com post submitted Nov. 12, 2013, 12 pages.*

(Continued)

*Primary Examiner* — Michael Pyzocha
(74) *Attorney, Agent, or Firm* — Mark M. Friedman

(57) ABSTRACT

Computerized methods and systems mitigate the effect of a ransomware attack on an endpoint by detecting access events associated with requests by processes, including ransomware processes, to access data items on the endpoint. The data items are hidden from the operating system processes executed on the endpoint. In response to detecting an access event, an action is taken against the process associated with the access event.

19 Claims, 8 Drawing Sheets

(56) References Cited

U.S. PATENT DOCUMENTS

| | | | |
|---|---|---|---|
| 2016/0182451 A1* | 6/2016 | Nandagopal | H04L 63/1441 726/12 |
| 2016/0378988 A1* | 12/2016 | Bhashkar | G06F 21/566 726/24 |
| 2017/0140156 A1* | 5/2017 | Gu | G06F 21/602 |
| 2017/0180394 A1* | 6/2017 | Crofton | H04L 63/145 |

OTHER PUBLICATIONS ingmar.koecher, "CryptoLocker Defense for Sysadmins (Part 1/3)", Dec. 5, 2013, 16 pages.* ingmar.koecher, "Trapping CryptoLocker/CryptoWall with Honey (Part 2/3)", Nov. 11, 2015, 9 pages.*

Doug N., "Early Detection and Prevention of CryptoLocker", Apr. 2, 2016, 3 pages.*

\* cited by examiner

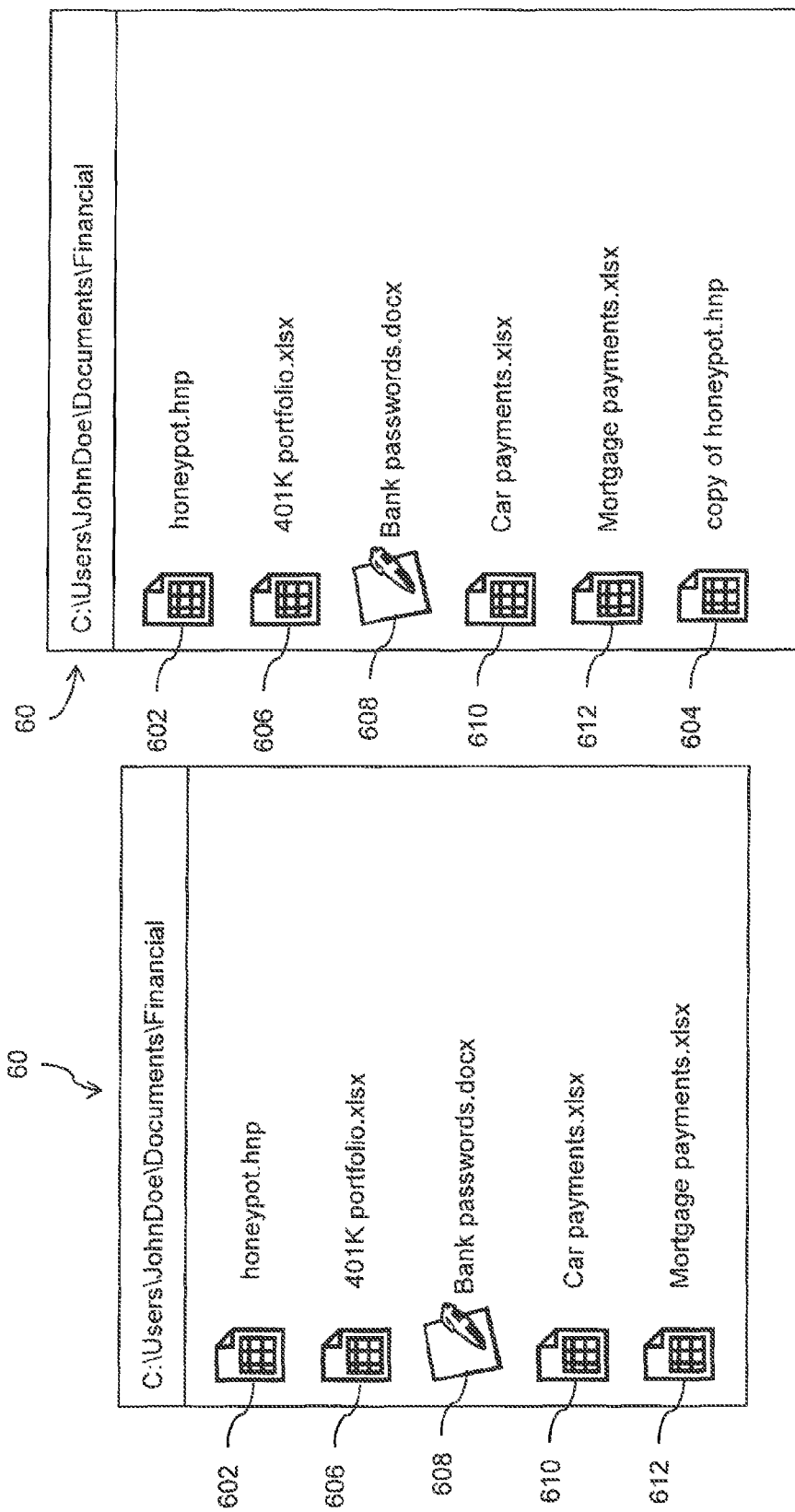

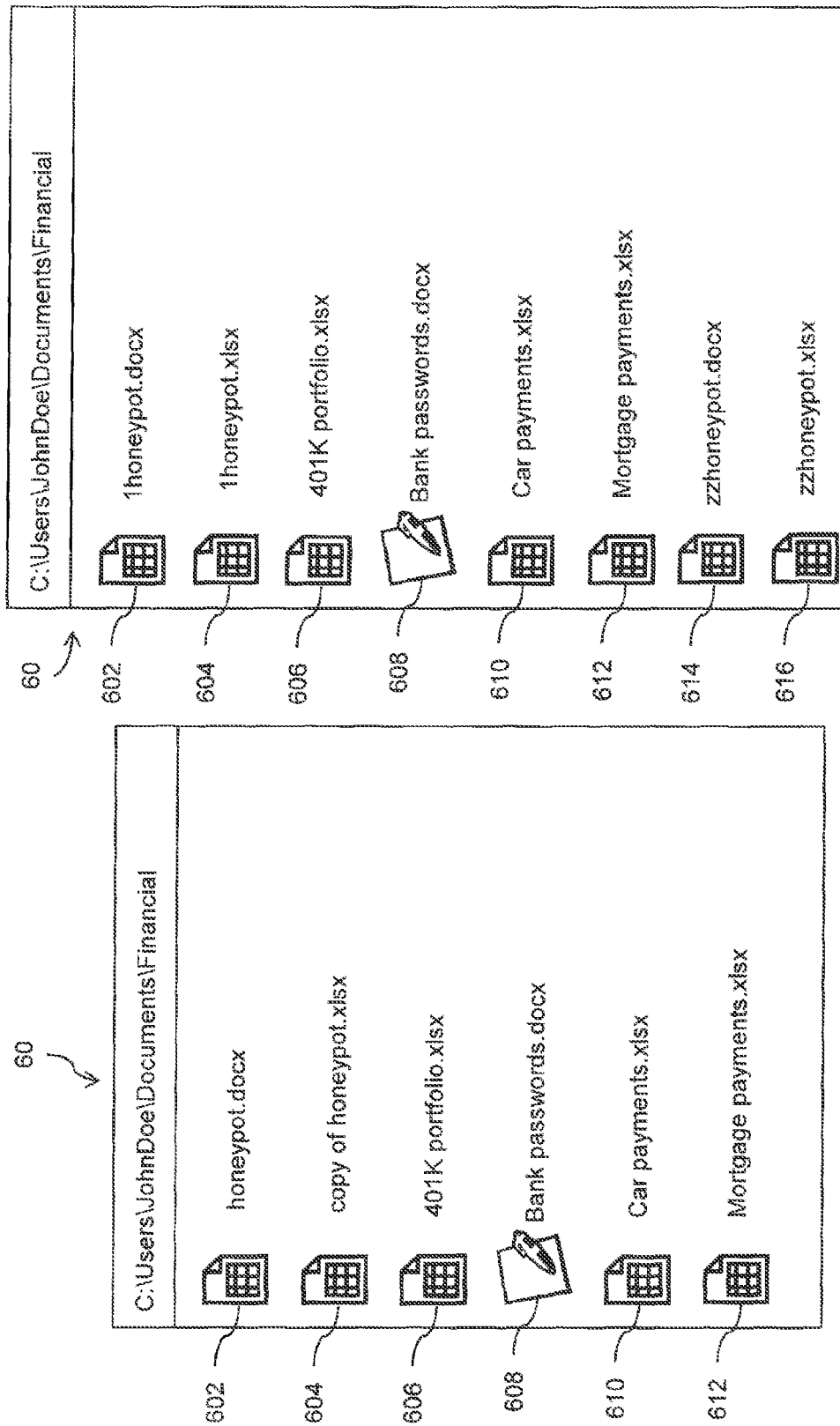

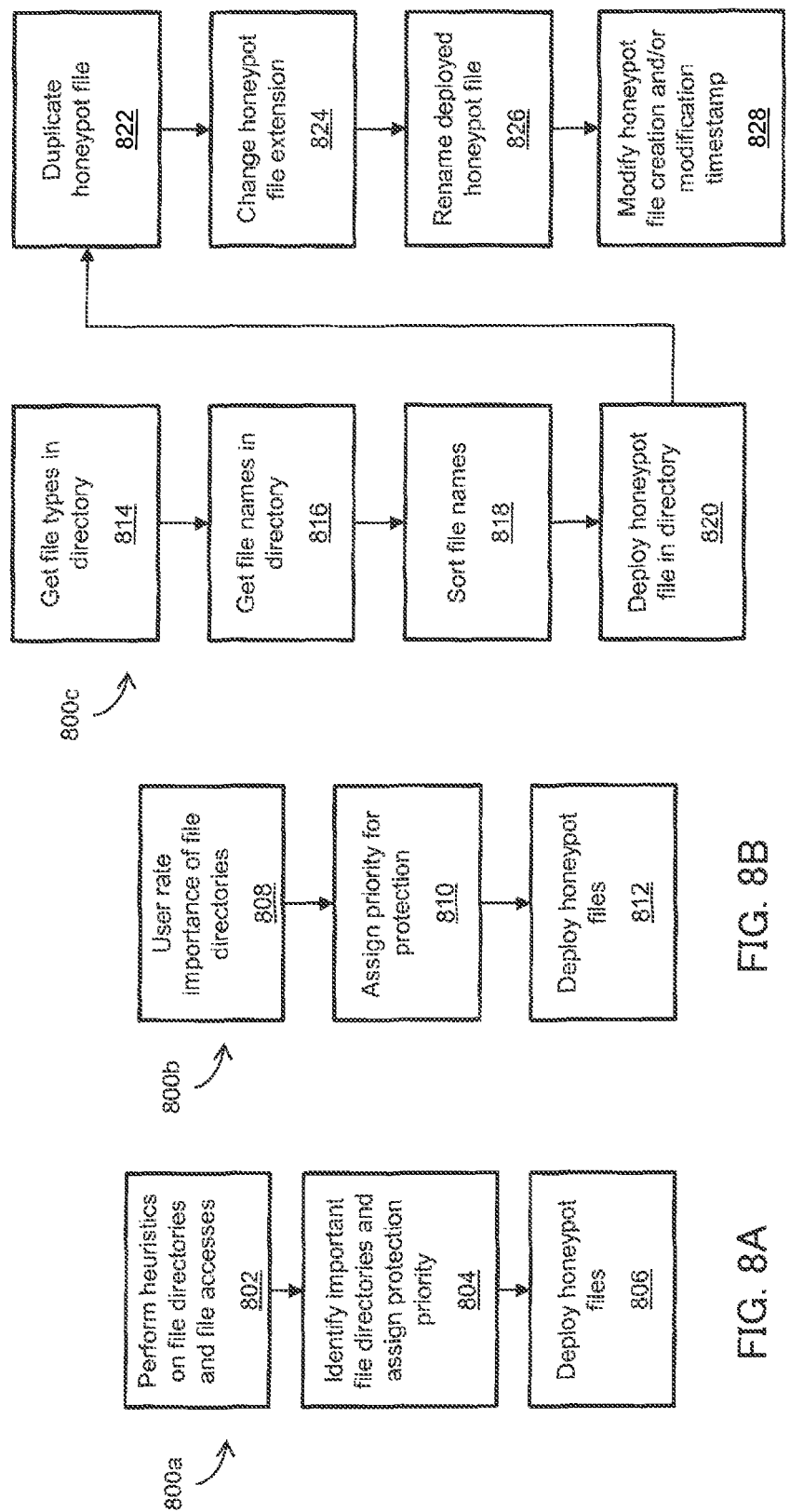

METHOD AND SYSTEM FOR MITIGATING THE EFFECTS OF RANSOMWARE

TECHNICAL FIELD

The present invention relates to methods and systems for ransomware mitigation.

BACKGROUND OF THE INVENTION

Malware is any software used to disrupt computer operations, gather sensitive information, or gain access to private assets residing in computer systems. Ransomware is a type of malware that restricts access to the infected computer system in some way and demands the computer system user to pay a ransom to the malware operator to remove the restriction. Certain forms of ransomware restrict access to the computer system by systematically encrypting files on the computer system hard drive, making it nearly impossible to decrypt and access the files on the hard drive without payment of the ransom. Other forms of ransomware restrict access to the computer system by locking the computer system, thereby disabling the user from accessing the computer system. Ransomware typically propagates as a Trojan having a payload disguised to the computer system user as being a legitimate file.

Software, such as, for example, anti-virus, anti-spyware, anti-malware and firewalls, are depended upon by computer users for protecting against malware and other malicious attacks, but are unsuccessful in mitigating the effects of ransomware infection.

SUMMARY OF THE INVENTION

The present invention is directed to computerized methods and systems, which mitigate the effects of ransomware infection and prevent the infection of ransomware.

Embodiments of the present invention are directed to a method for mitigating the effect of a ransomware attack on an endpoint. The method comprises: detecting at least one access event associated with a request by a process to access at least one data item on the endpoint, the at least one data item being hidden from operating system processes executed on the endpoint; and responding to the detecting of the at least one access event by taking at least one action against the process associated with the detected access event.

Optionally, the process is a ransomware process.

Optionally, the at least one data item includes a file.

Optionally, the method further comprises: deploying a plurality of files in a plurality of file directories on the endpoint, the plurality of files including the at least one data item.

Optionally, the method further comprises: modifying at least one property of each of the deployed files such that, the first file in each respective file directory accessed by a ransomware process during the ransomware attack is one of the deployed of files.

Optionally, the modifying the at least one property includes modifying the file extensions of at least a subset of the deployed files, such that at least one of the deployed files in a respective file directory has a different file extension from at least one other of the deployed files in the respective file directory.

Optionally, the modifying the at least one property includes modifying the file name each of the deployed files.

Optionally, the modifying the at least one property includes modifying at least one of: the file creation time of at least a subset of the deployed files, the file modification time of at least a subset of the deployed files, or a combination thereof.

Optionally, the at least one action is selected from the group consisting of: slowing down the process, preventing the process from accessing data items in addition to the at least one data item, suspending the process, creating a backup copy of at least a subset of data items sharing a common directory with the at least one data item, preventing the deletion of at least a subset of data items sharing a common directory with the at least one data item, and a combination thereof.

Optionally, the method further comprises: analyzing the process by performing at least one heuristic to determine whether the process is a ransomware process.

Optionally, the at least one heuristic is selected from the group consisting of: detecting the process by the signatures of the process, analyzing the permissions requested by the process, determining whether the at least one component of the at least one data item is encrypted, analyzing the entropy of the at least one data item subsequent to the process writing to the at least one data item, analyzing the process to predict the behavior of the process, and a combination thereof.

Optionally, the at least one action includes creating a backup copy of at least a subset of data items sharing a common directory path with the at least one data item, and deleting the backup copy if the process is determined not to be a ransomware process.

Optionally, causing the taking of a protective action if the process is determined to be a ransomware process.

Optionally, the endpoint is part of a network.

Embodiments of the invention are directed to a computer system for mitigating the effect of a ransomware attack on an endpoint. The computer system comprises: a storage medium for storing computer components; and a computerized processor for executing the computer components. The computer components comprise: a computer module configured for: detecting at least one access event associated with a request by a process to access at least one data item on the endpoint, the at least one data item being hidden from operating system processes executed on the endpoint; and responding to the detecting of the at least one access event by taking at least one action against the process associated with the detected access event.

Optionally, the at least one data item includes a file, and the computer module is further configured for: deploying a plurality of files in a plurality of file directories on the endpoint, the plurality of files including the at least one data item; and modifying at least one property of each of the deployed files such that, the first file in each respective file directory accessed by a ransomware process during the ransomware attack is one of the deployed of files.

Optionally, the computer module includes a file system filter driver.

Optionally, the computer module includes an agent.

Embodiments of the present invention are directed to a method for mitigating the effect of a ransomware attack on an endpoint. The method comprises: deploying a plurality of files in a plurality of file directories on the endpoint, each deployed file being hidden from operating system processes executed on the endpoint; modifying at least one property of each respective deployed file such that, each respective deployed file is the first file in the respective file directory accessed by a ransomware process during the ransomware attack; and detecting at least one access event associated with a request by a process to access at least one of the deployed files.

Optionally, the method further comprises: responding to the detecting of the at least one access event by taking at least one action against the process associated with the detected access event, the at least one action selected from the group consisting of: slowing down the process, preventing the process from accessing files in addition to the at least one file, suspending the process, creating a backup copy of at least a subset of files sharing a common directory path with at least one of the deployed files, preventing the deletion of at least a subset of files sharing a common directory path with at least one of the deployed files, and a combination thereof.

Optionally, the method further comprises: analyzing the process by performing at least one heuristic to determine whether the process is a ransomware process.

Embodiments of the invention are directed to a computer usable non-transitory storage medium having a computer program embodied thereon for causing a suitable programmed system to mitigate the effect of a ransomware attack on an endpoint, by perfoiming the following steps when such program is executed on the system. The steps comprise: detecting at least one access event associated with a request by a process to access at least one data item on the endpoint, the at least one data item being hidden from operating system processes executed on the endpoint; and responding to the detecting of the at least one access event by taking at least one action against the process associated with the detected access event.

Embodiments of the invention are directed to a computer usable non-transitory storage medium having a computer program embodied thereon for causing a suitable programmed system to mitigate the effect of a ransomware attack on an endpoint, by performing the following steps when such program is executed on the system. The steps comprise: deploying a plurality of files in a plurality of file directories on the endpoint, each deployed file being hidden from operating system processes executed on the endpoint; modifying at least one property of each respective deployed file such that, each respective deployed file is the first file in the respective file directory accessed by a ransomware process during the ransomware attack; and detecting at least one access event associated with a request by a process to access at least one of the deployed files.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g. laptop, desktop, tablet computer), or any type of computing device, including mobile devices that can be readily transported from one location to another location (e.g. smartphone, personal digital assistant (PDA), mobile telephone or cellular telephone).

A "process" refers to an instance of a computer program that is being executed (e.g. executable file). While a computer program is a passive collection of instructions; a process is the actual execution of those instructions. Each process provides the resources necessary to execute the program file. A process includes, for example, an image of the executable machine code associated with a program, memory (typically some region of virtual memory); which includes the executable code, process-specific data (input and output), a call stack (to keep track of active subroutines and/or other events), and a heap to hold intermediate computation data generated during run time, operating system descriptors of resources that are allocated to the process, such as handles for identifying the process to the operating system of the computer, security attributes, such as the process owner and the set of permissions (allowable operations) of the process, a unique identifier etc. A non-exhaustive list of examples of processes includes:

processes that are instances/executions of compression applications, such as, for example, zip applications, rar applications and the like;

processes that are instances/executions of network applications, such as, for example, email clients, web browsers (e.g. chrome, firefox, etc.), and FTP (file transfer protocol) clients;

processes that are instances/executions of payload applications, such as, for example, Microsoft® Office applications and Adobe® PDF Reader®;

processes that are instances/executions of executables written and maintained by the creators of the operating system (OS) (i.e., Microsoft) and packaged on the computer as part of the operating system, such as, for example, services.exe and expl.orer.exe.

A "payload application" refers to an application that is generally considered to be benign but that can be used for malicious intent if used to execute a malicious file. A non-exhaustive list of examples of payload applications includes:

Microsoft® Office applications (e.g. Microsoft® Word, Microsoft® Excel, Microsoft® Project, etc.);

Adobe® PDF Reader®.

A "compression/installer (install helper) application" refers to an application that is primarily purposed to reduce the size of a file and combine multiple files into a single file in order to facilitate easier storage, transmission and distribution. Compression applications are generally considered to be benign but can be used for malicious intent if used to extract a malicious file. A non-exhaustive list of examples of compression applications includes:

Zip applications;

RAR applications;

7z applications;

MISEXEC.

A "network application" refers to an application that is primarily purposed to initiate and maintain a connection between the computer running the network application and other computers on a network or over the Internet. A non-exhaustive list of examples of network applications includes:

email clients;

web browsers (e.g. chrome, firefox, etc.);

FTP clients.

A "honeypot" refers to any object on a network or computer that is used to detect, deflect or counteract attempts to gain unauthorized access to a computer by an attacker. The honeypot includes data that appears to be legitimate but is actually isolated and/or monitored by an entity on the network or the computer. The honeypot data seemingly contains information of value to the attacker, and is used to bait access by a process run by or created by a malicious program, such as, for example, a malware program, and more specifically a ransomware program.

A "honeypot file" refers to a type of honeypot that is a file placed in a directory or multiple directories of a user computer.

A "data item" refers to files, registry keys, or any other objects on a computer that can become restricted by a ransomware process. Files include, but are not limited to, user files, system files and honeypot files.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods andlor materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 6A-6D illustrate an example for deploying honeypot files in a file directory on an endpoint;

FIG. 8A is a flow diagram illustrating a heuristic process for deploying honeypot files on an endpoint, according to an embodiment of the invention;

FIG. 8B is a flow diagram illustrating a user input controlled process for deploying honeypot files on an endpoint, according to an embodiment of the invention;

FIG. 8C is a flow diagram illustrating a process for deploying honeypot files in a file directory on an endpoint, according to an embodiment of the invention;

DESCRIPTION OF THE PREFERRED EMBODIMENTS

Figure 1:
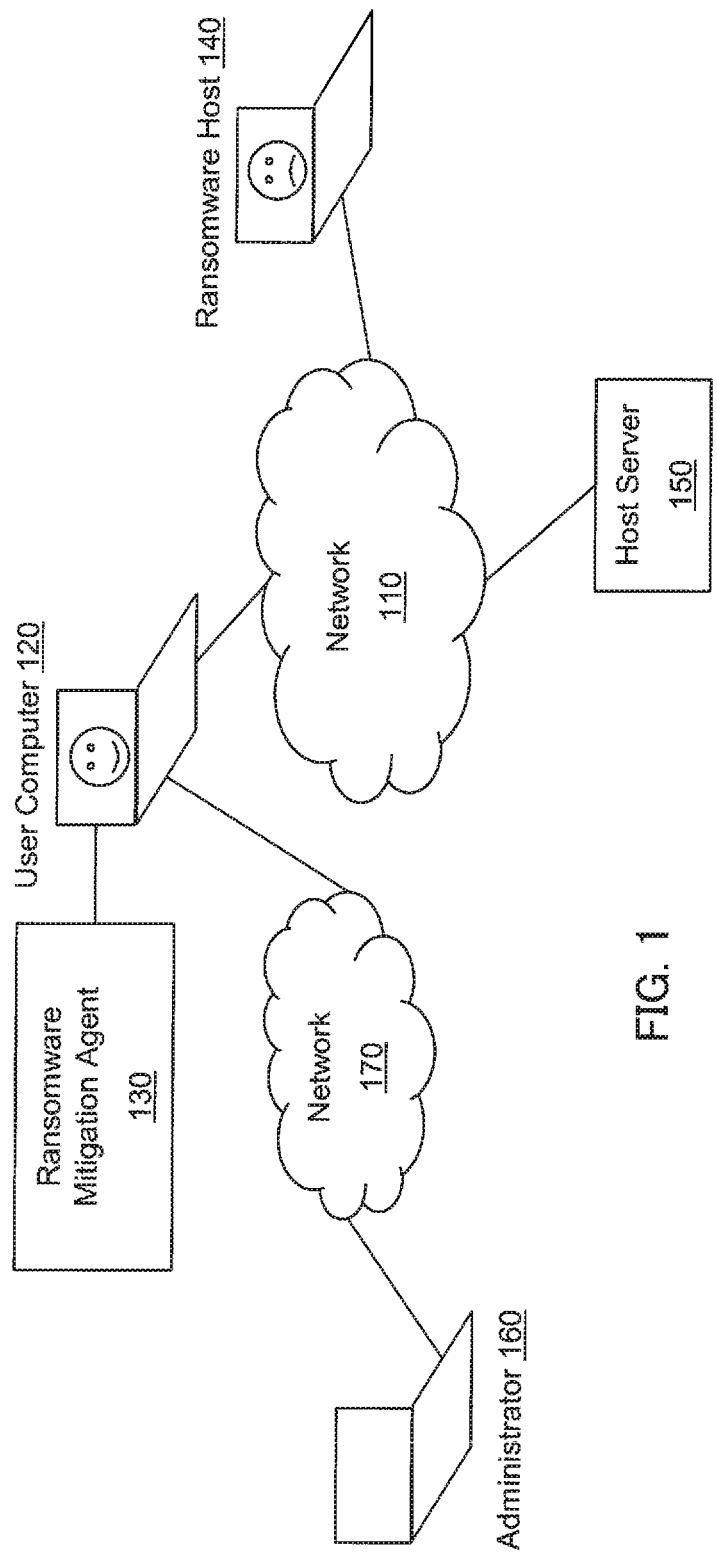
FIG. 1 is a diagram illustrating a system environment in which an embodiment of the invention is deployed.

The present invention is directed to computerized methods and systems, which mitigate the effects of ransonware infection and prevent the infection of ransomware. An agent installed on an endpoint client detects file access request activity by processes on the endpoint client computer, machine, or the like. Multiple honeypot files are strategically deployed throughout the file system of the endpoint client. When a process requests access to one of the honeypot files, the agent performs a cautionary action, such as, for example, reducing the central processing unit usage of the process. The agent subsequently or simultaneously performs heuristics to determine if the process requesting access to the honeypot file is a ransomware process.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Refer now to FIG. I, an illustrative example environment in which embodiments of the present disclosure may be performed. over a network 110. The network 110 may be formed of one or more networks, including for example, the Internet, cellular networks, wide area, public, and local networks. The embodiments include a system 120' (FIG. 2), including, for example, an agent 130, on an endpoint client, for example, a user computer 120 (linked to the network 110). The agent 130 mitigates the effect of a ransomware attack on the user computer 120. In a non-limiting example, a ransomware host 140, also linked to the network. 110, creates a malicious file that when executed calls a ransomware process. The malicious file is made available to a host server 150 by the ransomware host 140. The host server 150 is linked to the network 110 and represents numerous servers hosting, for example, web sites, accessible through web servers (not shown). In the non-limiting example environment of FIG. 1, the malicious file enters the user computer 120 via the access of the host server 150 by the user computer 120.

Note that although FIG. 1 illustrates a network based example environment for the proliferation of ransomware on the user computer 120, ransomware may infect the user computer 120 via alternative entry methods, such as, for example, a ransomware executable file stored on an external device (e.g., storage device) which can be connected, via a connector, such as, for example, a universal serial bus (USB) connection or the like, to the user computer 120.

The agent 130 includes software, software routines, code, code segments and the like, embodied, for example, in computer components, modules and the like, that are installed on machines, such as the user computer 120. For example, the agent 130 perforins an action when a specified event occurs, as will be further detailed below. The agent 130 may be instructed to perfonn such actions by an administrator 160. The administrator may be a computer separate from the user computer 120 linked to the user computer 120 via a private network 170 such as an Intranet. Alternatively, the administrator 160 may be linked to the user computer 120 via the network 110.

Figure 2:
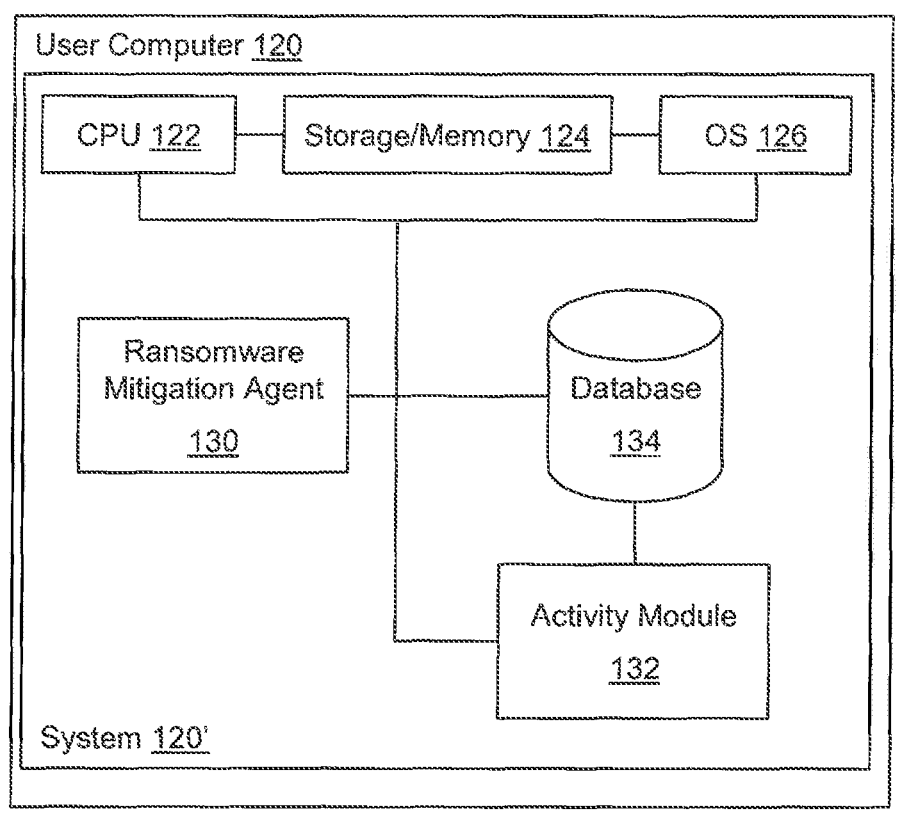
FIG. 2 is a diagram of the architecture of an exemplary system embodying the invention.

FIG. 2 shows the user computer 120 and the system 120' therein, as an architecture, with the agent 130 incorporated into the system 120' of the user computer 120. The system 120' is referred to as "the system" in the description of FIGS. 3-9 below. All components of the user computer 120 and/or the system 120' are connected or linked to each other (electronically and/or data), either directly or indirectly.

Initially, the user computer 120 includes a central processing unit (CPU) 122, a storage/memory 124, and an operating system (OS) 126. The processors of the CPU 122 and the storage/memory 124, although shown as a single component for representative purposes, may be multiple components.

The CPU 122 is formed of one or more processors, including microprocessors, for performing the user computer 120 functions, including executing the functionalities and operations of the agent 130, as detailed herein, the OS 126, and including the processes shown and described in the flow diagrams of FIGS. 8A-8C and 9. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 124 is any conventional storage media. The storage/memory 124 stores machine executable instructions for execution by the CPU 122, to perform the processes of the present embodiments. The storage/memory 124 also includes machine executable instructions associated with the operation of the components, including the agent 130, and all instructions for executing the processes of FIGS. 8A-8C and 9, detailed herein.

The OS 126 includes any of the conventional computer operating systems, such as those available from Microsoft of Redmond Washington, commercially available as Windows® OS, such as Windows® XP, Windows® 7, MAC OS from Apple of Cupertino, Calif., or Linux. Without loss of generality, and for the purposes of illustrating the computerized methods and systems disclosed herein, the subsequent sections of the present disclosure are described with respect to the OS 126 of the user computer 120 being a Windows® OS. As should be understood to one of ordinary skill in the art, the subsequent sections of the present disclosure could analogously be described with respect to the OS 126 of the user computer 120 being a non-Windows® OS.

Activity that occurs on the user computer 120 is logged and managed by an activity module 132 on the user computer 120. In particular, the activity module 132 is configured to sense changes that occur on the user computer 120. Examples of activity sensed by the activity module 132 may include, but is not limited to, file accesses, network accesses, application accesses, registry accesses, file creations, file modifications, process calls and process creations. Accordingly, when a process requests access to a file or other data item from the OS 126, the access request is propagated to the activity module 132 by the OS 126, allowing the agent 130 to view file access requests by processes created or executed on the user computer 120. In other words, the agent 130 retrieves and/or receives file access events from the activity module 132.

For computers running a Windows® OS, the activity module 132 is preferably implemented as a file system filter driver (FSFD). The FSFD is a driver that adds value to or modifies the behavior of the file system of the user computer 120. For example, the FSFD can filter input/output (I/O) operations for one or more file systems or file system volumes. The filtering executed by the FSFD can include, but is not limited to, logging, observing, modifying or preventing I/O operations.

The activity sensed by the activity module 132 may be written to (i.e., stored in) an activity log which can be maintained in a structured format, such as, for example, a database 134, accessible by the agent 130. The activity module 132 and the database 134 may be installed with the system 120', or may be provided on a remote server, such as, for example, a cloud server (and remain part of the system 120').

Figure 3:
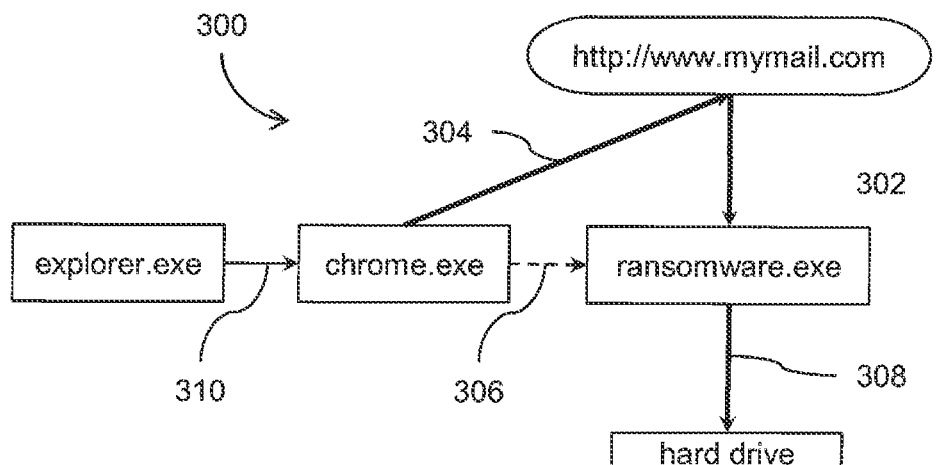
FIG. 3 is a diagram of an example of a ransornware attack.

To better understand the operation of the components of the system 120', including the agent 130 and all instructions for executing the processes of FIGS. 8A-8C and 9, an example of a network based ransomware attack 300 as carried out on the user computer 120 is first illustrated in FIG. 3. The attack 300 illustrated in FIG. 3 depicts paths that include creations of processes and data items (exemplified by thin dashed arrows), execution events in which a process executes (i.e., calls) another process (results of which are exemplified by thin solid arrows), and accesses, such as, for example, downloads, uploads, and file modifications (exemplified by thick solid arrows). Additional paths in examples of malware attacks may be depicted to show data transfers, file transfers, process accesses, network operations, registry entries, injections, mutexes, pipes, and application arguments.

In the example ransomware attack 300 illustrated in FIG. 3, a malicious process instance of ransomware.exe, enters the user computer as a file ransomware.exe (not shown) via a download 302 from a web site, for example, www.my-mail.com, accessed 304 through a web browser via the process chrome.exe. As a result, the process chrome.exe causes the creation 306 of the ransomware.exe executable file (and the execution of the process ransomware.exe). It is noted that the process chrome.exe is executed 310 by the Windows® OS process explorer.exe (which although not shown, is executed by a Windows® OS process such as, for example, userinit.exe). Although not shown in the drawings, the malicious process may be initially executed by a file (i.e., malicious file) that was extracted from a compressed file, such as, for example, a zip file, a rar file, or the like, downloaded from the web site.

The execution of the process ransomware.exe causes the restriction (e.g., encryption) 308 of files stored in a storage medium of the user computer 120, such as, for example, the storage/memory 124 or other storage devices coupled to the user computer 120, resulting in the demand for payment of the ransom in exchange for the decryption of the files to enable user of the user computer 120 to regain access to the files.

Note that alternatively, a ransomware attack may be initiated on the user computer 120 by the user computer 120 accessing a website or Internet address(i.e., a malicious website or Internet address), via a URL, IP address or the like. Also note that as mentioned above, non-network based ransomware attacks may be carried out via the execution of a ransomware executable file stored on an external device (e.g., storage device) connectable to the user computer 120 via a connector, such as, for example, a USB connection or the like.

Also note that ransomware processes typically access the files of the user computer in a file directory by iterating according to order and sorting settings programmed into the ransomware code by the ransomware creator. For example, the order and sorting settings of the ransomware code may allow the ransomware to iterate on files in a file directory according to alphabetical order, alphanumeric order, file creation timestamp, file modification timestamp, or a combination or sub-combination thereof. Once a specific file is accessed by the ransomware process, the ransomware performs operations to restrict access to the file, such as, for example, encrypting the file. Multiple file directories and sub-directories can be iterated on in parallel, allowing the ransomware process to restrict access to multiple files simultaneously.

Figure 4:
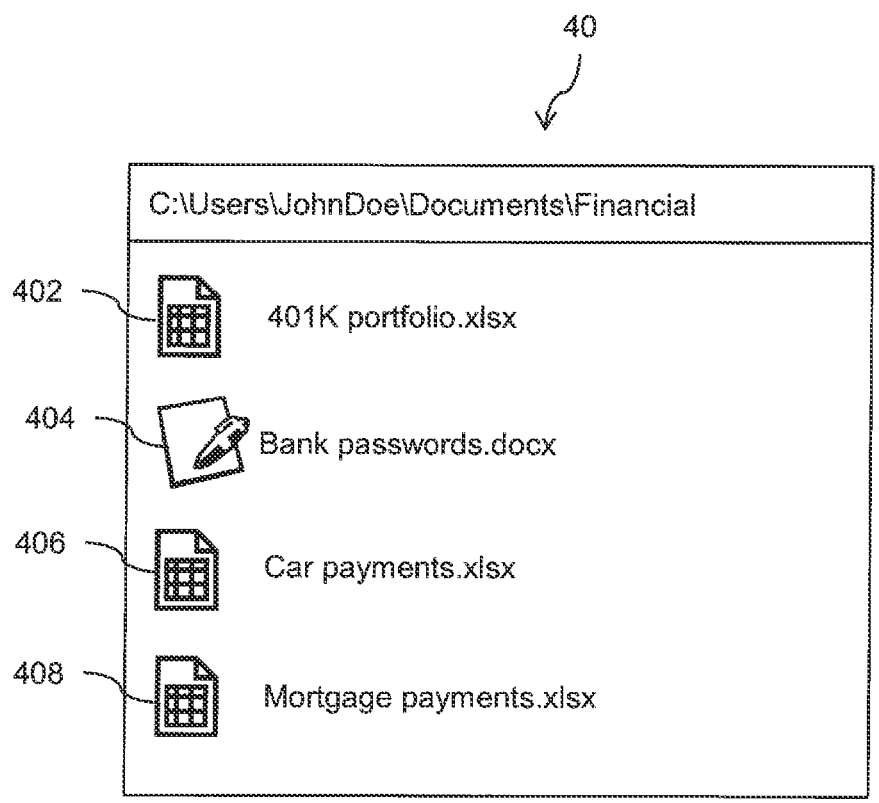
FIG. 4 is an example file directory on an endpoint containing tiles.
Figure 5:
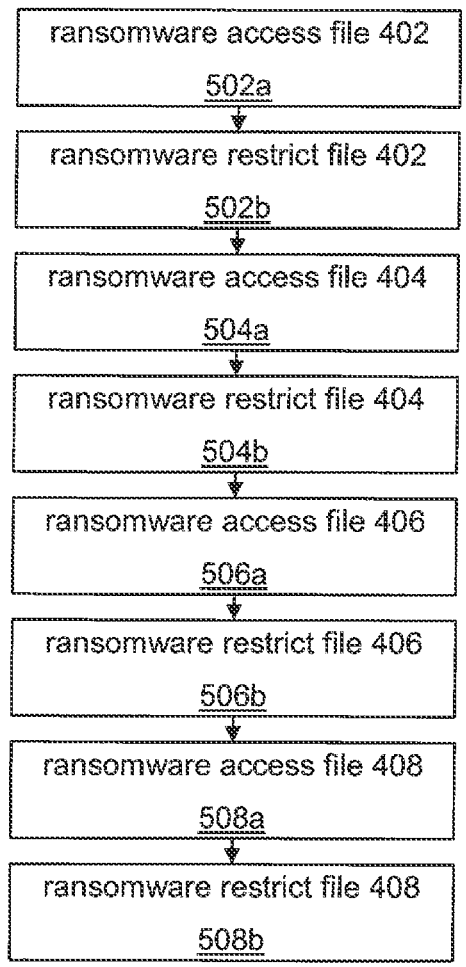
FIG. 5 illustrates an example of a ransomware process iteratively requesting access to the files of FIG. 4.

Refer now to FIGS. 4 and 5, an example of a ransomware process iterating on files in a file directory 40 named C:\Users\JohnDoe\Documents\Financial on a computer operated by user John Doe. In this example, the ransomware process iterates in alphabetical and alphanumeric order, as depicted in FIG. 5. As shown in FIG. 4, the file directory 40 includes four files: a spreadsheet file 402 named "401K portfolio.xlsx", a word processing file 404 named "Bank passwords.docx", a spreadsheet file 406 named "Car payments.xlsx", and a spreadsheet file 408 named "Mortgage payrnents.xlsx".

Accordingly, as shown in FIG. 5, the process ransomware.exe accesses 502a the spreadsheet file 402 and subsequently restricts (e.g. encrypts) 502b the access of the spreadsheet file 402 by the user. The process ransomware.exe then accesses 504a the word processing file 404 and subsequently restricts (e.g, encrypts) 504b the access of the word processing file 404 by the user. The process ransomware.exe then accesses 506a the spreadsheet file 406 and subsequently restricts (e.g. encrypts) 506b the access of the spreadsheet file 406 by the user. Finally, the process ransomware.exe accesses 508a the spreadsheet file 408 and subsequently restricts (e.g. encrypts) 508b the access of the spreadsheet file 408 by the user. Note that the ransomware could be programmed with alternate order and sorting to access the files in reverse alphabetical and/or alphanumeric order.

In order to mitigate the effects of a potential ransomware attack, a module, such as, for example, the activity module 132, deploys honeypot files in strategic file directories of the user computer 120. The deployment of such honeypot files may occur prior to an operational situation in which the user computer 120 is potentially exposed to a ransomware attack, such as, for example, prior to the first use over the network 110 or the network 170 of the user computer 120 by the user, or prior to the first connection to an external device (e.g., storage device) via a connector, such as, for example, a USB connection or the like.

The honeypot files include file properties and/or attributes which increase (i.e., optimize) the probability of a honeypot file being the first file accessed in a file directory by a ransomware process upon execution of a ransomware process on the user computer 120. Examples of such file properties include, but are not limited to, the file extension of a honeypot file, the name of a honeypot file, the creation timestamp of a honeypot file, and the modification timestamp of a honeypot file. In a non-limiting implementation, the honeypot files are named according to a strategic naming convention which increases (i.e., optimizes) the above mentioned probability. For example, the honeypot files can be named to begin with special characters, such as, for example 'a', 'z', '1', '#', '*', and the like. The honeypot files are preferably deployed in multiple directories which store information and data that is sensitive to the user of the user computer 120, to reduce the probability of the restriction of sensitive information and data by ransomware. In implementations in which the activity module 132 is implemented as a FSFD, it is preferred that the FSFD also serves as the module for deploying the honeypot files.

The deployed honeypot files are hidden from the user such that standard processes running on the user computer 120 during normal operation do not attempt to access the honeypot files. In other words, the deployed honeypot files are not visible to, and are not accessed by, the OS 126 processes executed on the user computer 120, and by extension, processes that are instances of payload applications, network application processes, or compression application processes. Accordingly, the deployed honeypot files are hidden from processes such as, for example, explorer.exe, cmd.exe, and sdbinst.exe. Hiding the honeypot files from the user may be accomplished by hooking techniques, or other similar methodologies, in order to alter or augment the behavior of the OS 126 with respect to the handling of the honeypot files.

Accordingly, when a process requests access to a honeypot file, the system 120' (i.e., the agent 130) is able to take actions, such as cautionary actions, and subsequently if necessary, a protective action, as will be further described in detail below.

Attention is now directed to FIGS. 8A and 8B which shows high level flow diagrams detailing computer-implemented processes 800a and 800b, respectively, in accordance with embodiments of the disclosed subject matter. Each of these computer-implemented processes includes an algorithm for strategically deploying honeypot files in file directories of the user computer 120 in order to help mitigate the effects of, and/or prevent, a ransomware infection. Reference is also made to the elements shown in FIGS. 1-7. The process and sub-processes of FIGS. 8A and 8B are computerized processes performed by the system 120' including, for example, the CPU 122 and associated components, such as the activity module 132, at the user computer 120, which as shown represents a client or client computer. The aforementioned processes and sub-processes are for example, performed automatically, but can be, for example, performed manually, and are performed, for example, in real time. For illustration purposes, the processes 800a and 800b are described herein as preferably executed by the activity module 132. As previously mentioned, a specialized deployment module other than the activity module 132 may be used to deploy the honeypot files in accordance with the processes 800a and 800b.

The process 800a depicts a non-limiting implementation of the deployment of honeypot files, in which a module, preferably the activity module 132, deploys honeypot files in file directories (i.e., file folders) on the user computer 120 via heuristic teclmiques or the like. The process 800a begins in block 802, where heuristics are performed to track the quantity and/or frequency of file directory and file accesses by the user of the user computer 120. The process 800a then moves to block 804, where file directories and/or files considered important to the user of the user computer 120 are identified by the system 120'. The identification of important file directories and/or files is performed based on the heuristics performed in block 802. The file directories and/or files identified as important are assigned a priority for protection against ransomware attacks. The heuristics performed in block 802 may include the execution of algorithms, such as, for example, supervised learning algorithms and/or unsupervised learning algorithms, designed to track the quantity and/or frequency of file directory and file accesses by the user of the user computer 120.

The process 800a then moves to block 806, where honeypot files are deployed in the file directories identified as important to the user in block 804. Accordingly, if the user accesses a large number of files in the "My Documents" file directory, or if the user opens the "My Documents" file directory a large number of times, the "My Documents" file directory is identified, based on the heuristic techniques performed in block 802, as important to the user of the user computer 120. As a result, a large number of honeypot files are deployed in the "My Documents" tile directory. It is note herein that the execution of block 806 for deploying the honeypot files results in the execution of several sub-blocks (or sub-steps), as will be described in further detail below.

Note that the level of importance of a file directory and/or file may also be determined based on the heuristics performed in block 802, and accordingly different file directories and/or files may be assigned varying priorities for protection. For example, files in the "My Music" directory may be accessed more frequently than files in the "My Videos" directory but less frequently than files in the "My Documents" file directory. Accordingly, the "My Music" file directory may be identified as important more important than the "My Videos" file directory, but less important than the "My Documents" file directory. As a result, the "My Music" file directory is assigned a lower priority for protection than the "My Documents" file directory, yet a higher priority for protection than the "My Videos" file directory and any file directory not identified as important based on the heuristics performed in block 802.

Further note that certain types of ransomware are programmed to target specific file types, such as, for example, files with a *.doc and *docx file extensions. Accordingly, the honeypot files are preferably deployed, or optionally duplicated, in block 806 with several different file extensions based on the type of the file directory in which the honeypot files are deployed. For example, honeypot files deployed in the "My Documents" file directory have file extensions, including, but not limited to, *.doc, *.docx, *.xls, *.xlsx *.txt, *.png, *.ppt, *.pptx and *.mpp, in order to mitigate the effects of different types of ransomware which are configured for restricting access to specific file types.

The number of honeypot files deployed in each file directory is also preferably a function of the quantity and/or frequency of tile directory and file accesses of the user on the user computer 120. Accordingly, frequently accessed file directories have a larger number of honeypot files than infrequently accessed file directories. Note that it is preferred that the majority of file directories on the user computer 120 include at least one deployed honeypot file to help mitigate the effects of potential ransomware attacks.

Alternative to the non-limiting implementation of the deployment of honeypot files in the process 800a described above, non-heuristic techniques may be used which provide the user of the user computer 120 a higher degree of input control as to the location and/or quantity of deployed honeypot files. For example, the process 800b shows a non-limiting implementation of user input controlled deployment of honeypot files. As shown in FIG. 8B, the user of the user computer 120, may rate, to varying degree, more important and less important file directories for honeypot file deployment.

The process 800b begins in block 808, where the user of the user computer 120 rates, from least important to most important, file directories for honeypot file deployment. The user rating is made via an application program interface (API) coupled to the deployment module (i.e., the activity module 132). The process then moves to block 810 where the file directories rated by the user as more important are assigned higher priority for protection against ransomware attacks, and file directories rated by the user as less important are assigned lower priority for protection against ransomware attacks. As a result, the file directories are assigned priorities ranging from a highest priority to a lowest priority. Unrated file folders are assigned the lowest priority. The process 800b then moves to block 812, where honeypot files are deployed in the file directories based on the priority assignment resultant from block 810. It is note herein that the execution of block 812 for deploying the honeypot files results in the execution of several sub-blocks (or sub-steps), as will be described in further detail below.

Note that the number of honeypot files deployed in each file directory is a function of the assigned priority. As a result, file directories assigned as higher priority have more honeypot files than file directories assigned as lower priority. Also note that the deployment, or optionally the duplication, of honeypot files with various file extensions in the process 800b is performed similarly to the deployment, or optionally the duplication, of honeypot files with various file extensions in process 800a described above.

Also note that the execution of block 808 for providing the ratings of the importance of file directories may be aided, at least in part, by algorithms, such as, for example, supervised learning algorithms. For example, subsequent to the user of the user computer 120 rating the importance of a subset of the file directories, a learning algorithm trained on the selection behavior of the user, may automatically rate the importance of additional file directories based on the previous user ratings. Alternatively, a learning algorithm trained on the historical file directory and file accesses of the user may perform the entirety of the importance ratings executed in block 808

To better understand the effects of ransomware on file directories that include deployed honeypot files, an example of the resultant deployment of honeypot files in a single user file directory is described with reference to FIG. 6D. A file directory 60 similar to the file directory 40, includes files 606-612 which are the same files shown in FIG. 4. In addition, the file directory 60 includes four honeypot files: a first honeypot file 602 named "1honeypot.docx", a second honeypot file 604 named "1honeypot.xlsx", a third honeypot file 614 named "zzhoneypot.docx", and a fourth honeypot file 616 named "zzhoneypot.xlsx".

Figure 7:
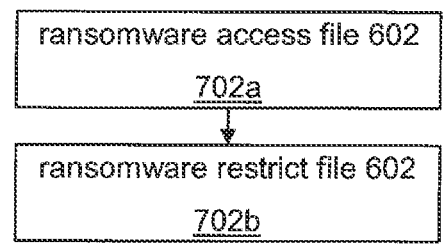
FIG. 7 illustrates an example of a ransomware process requesting access to a honeypot file.

Using the example file directory 60 in FIG. 6D and a ransomware process with. the same order and sorting as described with reference to FIGS. 4 and 5, the ransomware process iterates on the files in the file directory 60, resulting in the access 702a and attempted restriction (i.e., encryption) 702b of the first honeypot file 602 on the first file access iteration of the ransomware process, as shown in FIG. 7. The strategic deployment of the honeypot files exploits the iterative file accessing methodology used by ransoinware processes in order to allow the system 120' to take actions against ransomware, as will be further described in detail below.

As mentioned above, hiding the honeypot files from the user may be accomplished by hooking techniques, or other similar methodologies. Using the example file directory 60, hiding the honeypot files 602, 604, 614 and 616 may be implemented by making the honeypot files 602, 604, 614 and 616 non-visible (i.e., not visibly displayed in the file directory 60) to a physical user of the user computer 120, while maintaining artifacts of the honeypot files 602, 604, 614 and 616 in the user computer 120 memory (e.g., hard drive) and/or file system, allowing a ransomware process to request access to the honeypot files 602, 604, 614 and 616.

Alternatively, or additionally, hiding the honeypot files 602, 604, 614 and 616 may be implemented by allowing the honeypot files 602, 604, 614 and 616 to be physically seen in the file directory 60 by a physical user of the user computer 120, but not allowing any process running on the user computer 120 during normal operation to access the honeypot files 602, 604, 614 and 616. As a result, for example, a physical user of the user computer 120 may attempt to open the honeypot file 602 using a traditional method used to open files on computers running the Windows® OS (i.e., hovering the mouse cursor over the file and double-clicking on the file using the mouse). For example, the typical process flow for opening a non-honeypot file with a *.doc file extension includes the process userinit.exe calling explorer.exe, which in turn calls winword.exe (i.e., an instance of the Microsoft® Word payload application) to open the *.doc file. However, since the honeypot file 602 is hidden from the user, the process explorer.exe cannot find the honeypot file 602, and as a result, winword.exe cannot access the honeypot file 602. In other words, a physical user of the user computer 120 double-clicking on a hidden honeypot file results in no request to access the honeypot file by any of the OS 126 processes called, or by any of the application, network, or compression processes called by OS processes running on the OS 126.

Attention is now directed to FIG. 8C which shows a flow diagram detailing a computer-implemented process 800c in accordance with embodiments of the disclosed subject matter. This computer-implemented process includes an algorithm for deploying honeypot files in a file directory of the user computer 120 in order to help mitigate the effects of, and/or prevent, a ransomware infection. The execution of the process 800c as described herein performs some of the sub-blocks (or sub-steps) of the deployment of honeypot files executed by blocks 806 and 812 described above. Accordingly, the process 800c is performed concurrently with either of the processes 800a or 800b. More simply stated the process 800c is performed once a file directory is identified as important by the process 800a, or rated with a certain degree of importance by the process 800b. Note that the process 800c as described herein is a simplified illustrative example of the deployment of honeypot files. For example, the process 800c as described herein details deploying a limited number of honeypot files with file extensions matching only the file extensions of the file types of the original files in the respective file directory. As should be understood, various blocks of the process 800c may be modified, rearranged, and/or removed in order to generate the desired resultant deployment of honeypot files in accordance with the heuristic and non-heuristic deployment techniques of the processes 800a and 800b, respectively, mentioned above.

Accordingly, the process 800c is herein described for the deployment of honeypot files in a single file directory. As should be understood to one of ordinary skill in the art, the execution of the process 800c can be applied to any or all of the file directories on the user computer 120. For illustration purposes, the process 800c is described herein as executed by the activity module 132. As previously mentioned, a specialized deployment module other than the activity module 132 may be used to deploy the honeypot files in accordance with the process 800c.

In describing the process 800c as shown in FIG. 8C, reference is also made to the elements shown in FIGS. 1-8B. The process and sub-processes of FIG. 8C are computerized processes performed by the system 120' including, for example, the CPU 122 and associated components, such as the activity module 132, at the user computer 120, which as shown represents a client or client computer. The aforementioned processes and sub-processes are for example, performed automatically, but can be, for example, performed manually, and are performed, for example, in real time.

The process 800c begins at block 814, where the file types (i.e., file extensions) of the files in a specified file directory, such as, for example, the file directory 40 shown in FIG. 4, are retrieved by the activity module 132. For example, the execution of block 814 on the files in the file directory 40 results in the following file types: 1) open extensible markup language (XML) spreadsheet file for Microsoft® Excel (i.e., *.xlsx), and 2) XML document file for Microsoft® Word (i.e., *.docx).

The process 800c then moves to block 816, in which the names of the files in the specified file directory are obtained by the activity module 132. The process then moves to block 818, where the file names obtained in block 816 are sorted, preferably in alphabetical or alphanumeric order, for each file type retrieved in block 814. For example, sorting the file names of the files 402-408 in the file directory 40 of FIG. 4 in alphanumeric order according to block 818 for each file type, results in the following sorting for *.docx file types: 1) "Bank passwords", and the following sorting for *.xlsx file types: 1) "401K portfolio", 2) "Car payments", and 3) "Mortgage payments". Note that the sorting executed in block 818 is typically performed by the OS 126 when a request is made to access a file in the specified file directory.

The process 800c then moves to block 820, where a honeypot file is deployed in the specified file directory. The deployed honeypot file may be deployed with a predetermined standard file name and file extension, such as, for example "honeypot.hnp". The deployed honeypot file is illustrated in FIG. 6A as the honeypot file 602 named "honeypot.hnp". The process 800c then moves to block 822, where the honeypot file is duplicated such that there is at least one honeypot file for each of the file types retrieved in block 814. As shown in the example file directory in FIG. 6B, the honeypot file deployed in block 820 is duplicated once, such that there are two honeypot files 602 and 604 in the file directory, one honeypot file for the *.docx files, and one honeypot file for the *.xlsx files.

The process then moves to blocks 824-828, where the properties of the honeypot files are modified to increase the probability of a honeypot file being the first file accessed in a file directory by a ransomware process. As mentioned above, examples of such properties include, but are not limited to, file extensions, file names, file creation timestamps, and file modification timestamps.

Specifically, in block 824 any or all of the file extensions of the deployed and duplicated honeypot files are changed. As shown in the example file directory in FIG. 6C, the file extension of the first honeypot file 602 is changed to *.docx, while the file extension of the second honeypot file 604 (i.e., duplicated honeypot file) is changed to *.xlsx. Note that the execution of blocks 822 and 824 is preferably performed based on info, illation obtained during the execution of blocks 802 and 804 of the process 800a, or during the execution of the blocks 808 and 810 of the process 800b.

The process 800c then moves to block 826, where the honeypot files are renamed based on the sorting performed in block 818 for each of the file types retrieved in block 814. As shown in the example file directory in FIG. 6D, the first honeypot file 602 is renamed as "1honeypot.docx" and the second honeypot file 604 is renamed as "1honeypot.xlsx". Accordingly, when the files in the example file directory 60 are re-sorted (as in block 818), the sorting results in the following sorting for *.docx file types: 1) "1honeypot", and 2) "Bank passwords", and the following sorting for *.xlsx file types: 1) "1honeypot", 2) "401K portfolio", 3) "Car payments", and 4) "Mortgage payments".

The process 800c then moves to block 828, where some, any, or all of the timestamps of the creation and/or modification of the honeypot files are modified. As should be understood, the timestamp of the creation and/or modification of a file typically include the corresponding date and time of the file creation and/or file modification. As a result, for example, the timestamps may he modified such that the deployed honeypot files appear to the ransomware to be the most recently created and/or modified files in the file directory. Alternatively, the timestamps may be modified such that the deployed honeypot files appear to the ransomware to be the least recently created and/or modified files in the file directory. For clarity of illustration, the file creation and/or file modification timestamps are not shown in the example file directories illustrated in FIGS. 6A-6D.

Note that any or all of the renamed honeypot files may be further duplicated and renamed, and optionally the corresponding timestamps modified, in order to increase the probability of a honeypot file being the first file accessed in a file directory by a ransomware process. A result is shown in FIG. 6D, in which the honeypot files 602 and 604 are duplicated and renamed as a third honeypot file 614 named "zzhoneypot.docx" and a fourth honeypot file 616 named "zzhoneypot.xlsx", respectively. Accordingly, when the files in the example file directory 60 of FIG. 6D are re-sorted (as in block 818), the sorting results in the following sorting for *.docx file types: 1) "1honeypot", 2) "Bank passwords", and 3) "zzhoneypot", and the following sorting for *.xlsx file types: 1) "1honeypot", 2) "401K portfolio", 3) "Car payments", 4) "Mortgage payments", and 5) "zzhoneypot".

Further note that achieving such a variety of honeypot file names and file extensions as illustrated in FIG. 6D may be accomplished in several different ways, and the methodology of the process 800c described above with reference to FIGS. 6A-6D is provided as an exemplary non-limiting illustration. For example, as an alternative, the process 800c may execute block 822 such that honeypot files are duplicated multiple times and renamed (block 826) only once subsequent to the duplication. With reference to FIGS. 6A-6D, the honeypot file 602 may be duplicated three times to generate the honeypot files 604, 614 and 616. Subsequently, the file extensions of the honeypot files 602 and 614 are changed to *.docx and the file extensions of the honeypot files 604 and 616 are changed to *.xlsx (block 824). Finally, the honeypot files 602, 604, 614 and 616 are renamed (block 826) to yield the honeypot files as shown in FIG. 6D. The timestamp of the creation and/or modification of any or all of the honeypot files 602, 604, 614 and 616 may then be modified (block 828).

It is noted that in the non-limiting exemplary implementation of the deployment of the honeypot files described with reference to FIG. 8C, the initially deployed honeypot file, for example, the honeypot file 602 of FIG. 6A, includes file attributes which render the initially deployed honeypot file hidden from the user as previously described. Accordingly, upon duplication and file property modification of the initially deployed honeypot file (blocks 822-828), the file attributes of the initially deployed honeypot file are also copied (i.e., duplicated), such that all of the duplicated and renamed honeypot files, for example, the honeypot files 604, 614 and 616 of FIG. 6D, include similar file attributes which render such honeypot files hidden from the user. In an alternate implementation of the deployment of the honeypot files, the file attributes of all of the deployed, duplicated and renamed honeypot files may be changed, to include file attributes which render such honeypot files hidden from the user, after the completion of the deployment of the honeypot files.

Also note that block 822 (i.e., the duplication of honeypot files) may be removed or not executed, in conjunction with a modified execution of block 820, such that the number of honeypot files to be deployed in the specific file directory are deployed in a single execution of block 820. With continued reference to FIGS. 6A-6D, the execution of such a modified block 820 would result in the deployment of four honeypot files which are not copies of one another. The subsequent execution of blocks 824 and 826 would generate the four honeypot files with varying file extensions and file names, with the execution of block 828 resulting in modification of the timestamps of the creation and/or modification of the honeypot files.

Further note that the process 800c may be modified to include a modified version of block 814 such that the deployed honeypot files include more diverse file extensions than the file types of the files originally located in the specific file directory, in accordance with the processes 800a and 800b as described above. Accordingly, although the example deployment of honeypot files with reference to FIGS. 6A-6D illustrates honeypot files with only two file extension types (*.docx and *.xlsx) based on the execution of block 814, the honeypot files may also include additional file extension types corresponding to typical file extensions of file types found in file directories similar to the example file directories 40 and 60, such as, for example, *.ppt, *.pptx and *.txt, or any of the typical file extensions of file types found in the "My Documents" file directory previously discussed.

Once the honeypot files are deployed, either by the activity module 132 or a specialized deployment module, in accordance with the honeypot file deployment techniques described above, the agent 130 can execute a computer-implemented process for mitigating the effects of, and/or preventing, a ransomware attack or infection on the user computer 120.

Figure 9:
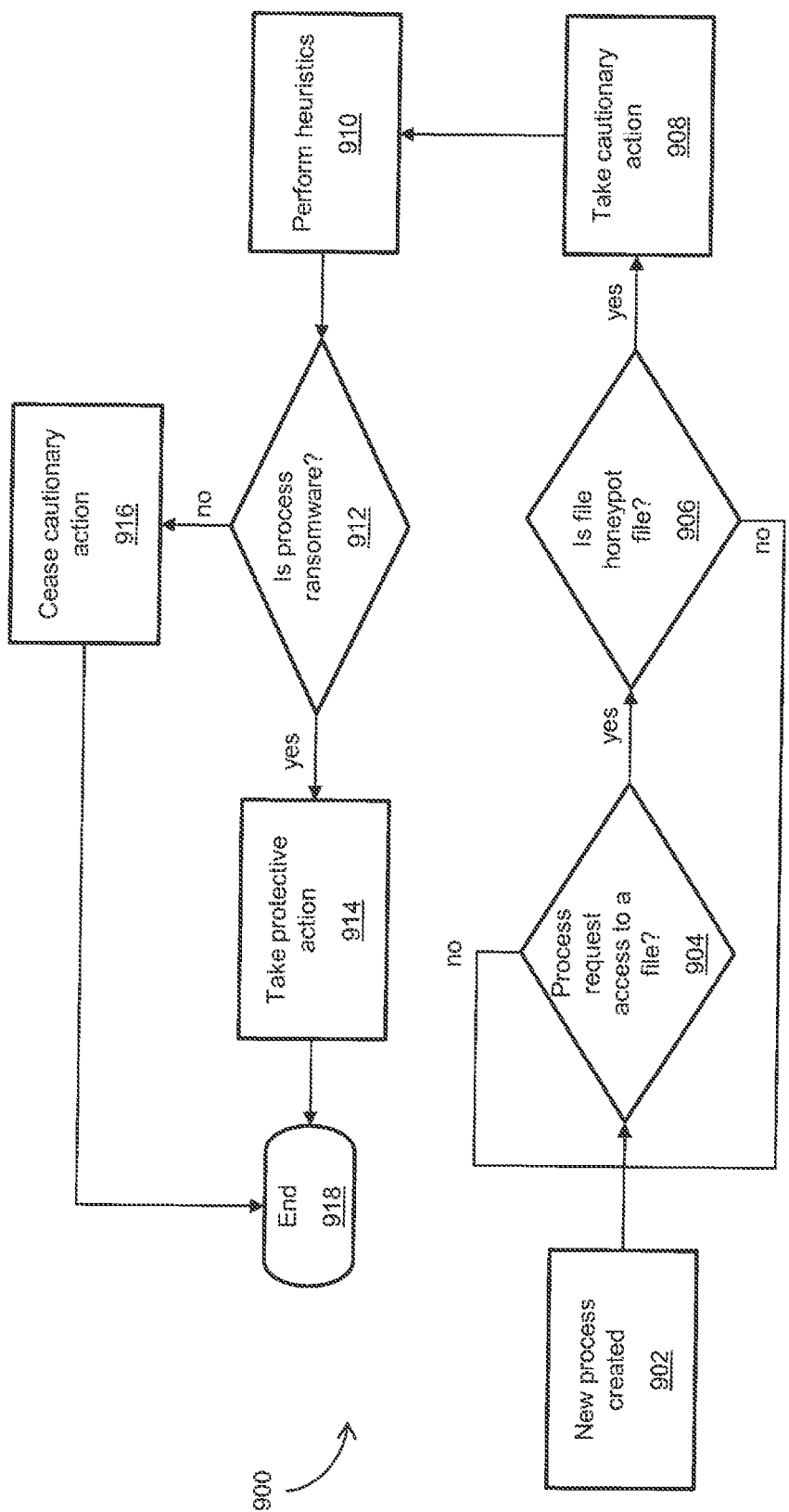
FIG. 9 is a flow diagram illustrating a process to mitigate the effects of a ransomware attack initiated on an endpoint according to an embodiment of the invention.

Attention is now directed to FIG. 9 which shows a flow diagram detailing a computer-implemented process 900 in accordance with embodiments of the disclosed subject matter. This computer-implemented process includes an algorithm for mitigating the effects of, and/or preventing, a ransomware infection on the user computer 120. Reference is also made to the elements shown in FIGS. 1-8C. The process and sub-processes of FIG. 9 are computerized processes performed by the system 120' including, for example, the CPU 122 and associated components, such as the agent 130, at the user computer 120, which as shown represents a client or client computer. The aforementioned processes and sub-processes are for example, performed automatically, but can be, for example, performed manually, and are performed, for example, in real time.

The process 900 begins at block 902 when a new process instance is created that will appear in the activity module 132. The process 900 then moves to block 904, where the new process is analyzed by the system according to the activity module 132 to determine if the new process has made any file access requests. If the new process requests access to a file, the activity module 132 provides an indication to the system 120' of the requested file access. The process 900 then moves to block. 906. The process 900 may loop on block 904 until a file access request is made by the new process. This may be equivalently understood as the system 120' monitoring for, and/or, detecting file access requests by newly created processes.

In block 906, a determination is made as to what type of file the new process requests access to. As previously mentioned, the module that deploys the honeypot files is preferably, but not necessarily the activity module 132. In implementations in which a deployment module other than the activity module 132 is used to deploy the honeypot files in accordance with the honeypot file deployment techniques as previously described, the activity module 132 is provided with the details of the honeypot file deployment by the deployment module. In other words, the deployment module for implementing the honeypot file deployment techniques is in communication with the activity module 132 in order to provide the activity module 132 with the details of the honeypot file deployment. Accordingly, the activity module 132 has full knowledge as to whether the access request by the new process pertains to accessing a honeypot file or a non-honeypot file. If the new process requests access to a honeypot file, the process 900 moves to block 908. If the new process requests access to a non-honeypot file, the process returns to block 904, or optionally returns to block 902 (not shown) to await the creation of a new process.

Since the honeypot files are designed and deployed in a manner in which standard processes which are executed on the user computer 120 during normal operations (i.e., during non-ransomware attacks) do not request access to the honeypot files, the request to access a honcypot file by a process is deemed as a suspicious access request, and the process that made the request to access a honeypot file is flagged as a potential ransomware process. Therefore, in block 908 the agent 130 is able to quickly initiate (by signaling) the taking of a cautionary action or actions by the user computer 120. Subsequently, or preferably in parallel, heuristics are performed by the agent 130 on the new process, as shown in block 910, in order to make a determination as to whether the process that made the request to access the honeypot file is a ransomware process.

In an exemplary configuration of the system 120', the primary cautionary action initiated by the agent 130 includes slowing down the new process (and any sub-processes created or executed by the new process) in order to quickly perform the heuristics in block 910 before the new process is able to restrict (e.g., encrypt) the honeypot file. Different methods may be used to slow down the new process, including, but not limited to, using the OS 126 process scheduler to slow down the new process, limiting the CPU 122 usage of the new process, lowering the priority of the new process, or any other technique that allows timely parallel performance of heuristics on the new process before the new process restricts the honeypot file.

Additional cautionary actions initiated by the agent 130 may also include actions such as: 1) preventing the new process (or any sub-process created or executed by the new process) from accessing files in the same directory or in a sub-directory as the honeypot file to which the access request was made; 2) suspending the new process (or any sub-process created or executed by the new process; 3) creating a backup copy of some or all of the files that are in the same directory or in a sub-directory of the honeypot file to which the access request was made; and 4) blocking the execution of the file deletion operation to prevent the deletion of some or all of the files that are in the same directory or in a sub-directory of the honeypot file to which the access request was made.

As mentioned above, heuristics are performed on the new process in block 910 in order to ascertain information about the process that made the request to access the honeypot file. Heuristics performed by the agent 130 may include: 1) detecting the process type by the signatures of the process; 2) analyzing the permissions requested by the process; 3) determining whether any or all of the components of the honeypot file to which the access request was made is fully or partially encrypted; 4) analyzing the entropy of the honeypot file to which the access request was made subsequent to the process writing to that honeypot file; and 5) analyzing the process to predict the behavior of the process.

The analysis of the process for predicting the behavior of the process may be done either statically or dynamically. Such analysis techniques include, but are not limited to, analyzing for massive file iteration functionality, checking for linked cryptography libraries, and performing anomaly detection.

Subsequent to the performance of the heuristics in block 910, the process moves to the decision block 912. If the new process is determined to be a ransomware process, based on any or all of the heuristics performed in block 910, the process moves to block 914, where the agent 130 initiates (by signaling) the taking of protective actions by the user computer 120.

Such protective actions may include: 1) preventing the new process (or any sub-process created or executed by the new process) from accessing any other files stored the user computer 120 (in the storage/memory 124 or other storage devices coupled to the user computer 120); and 2) stopping the new process (or any sub-process created or executed by the new process.

Such protective actions may also include remediation actions such as: 1) displaying a message, warning window, or the like, on the user computer 120; 2) suspending the administrative account of the user, for example, by locking the user computer 120; 3) alerting or notifying the system administrator 160 about this security incident; and 4) quarantining the user computer 120, e.g., blocking the user computer 120 from accessing the network 110, or otherwise disconnecting the user computer 120 from the network 110, or disabling the user computer 120.

The process 900 is then terminated in block 918. Note that in practice, the process 900 may be programmed to continue as a loop for every new process that is created. Accordingly, although not shown in the drawings, the process 900 may also move to block 902 from block 914.

As mentioned above, the process 900 moves to block 914 from block 912 if any or all of the heuristics performed in block 910 indicate that the new process is a ransomware process. If the heuristics indicate that the new process is not a ransomware process, the process 900 moves to block 916 from block 912.

In block 916, the system 120' (i.e., the agent 130) ceases any or all of the cautionary actions taken in block 908. Supposing, for example, that the cautionary actions initiated by the agent 130 in block 908 included limiting the CPU 122 usage of the new process and creating a backup copy of all of the files in the same directory of the honeypot file to which the access request was made. Accordingly, in block 916, the agent 130 may initiate (i.e., instruct), the scheduler to remove the limit imposed on the CPU 122 usage of the new process, and initiate the deletion of any or all of the backup files that were created as the result of the execution of block 908.

From block 908, the process 900 is then terminated in block 918. As previously mentioned, in practice, the process 900 may be programmed to continue as a loop for every new process that is created. Accordingly, although not shown in the drawings, the process 900 may also move to block 902 from block 916.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platfoi in for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can he performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments, The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for mitigating the effect of a ransomware attack on an endpoint, comprising:
   deploying a plurality of data items in a plurality of file directories on the endpoint, each of the deployed data items being hidden from operating system processes executed on the endpoint and including data for baiting a ransomware process to request access to the deployed data items, the deploying based on a protection priority level assigned to the file directories and user files in the file directories, the protection priority level derived from the quantity and frequency of historical accesses, by a user of the endpoint, to the file directories and user files in the file directories, such that, the number of data items deployed in each respective file directory increases with respect to the protection priority level assigned to the respective file directory and the files in the respective file directory;
   detecting at least one access event associated with a request by a process to access at least one of the deployed data items on the endpoint; and
   responding to the detecting of the at least one access event by taking at least one action against the process associated with the detected access event.

2. The method of claim 1, wherein the process is a ransomware process.

3. The method of claim 1, wherein each of the deployed data items includes a file.

4. The method of claim 3, further comprising:
   modifying at least one property of each of the deployed files such that, the first file in each respective file directory accessed by a ransomware process during the ransomware attack is one of the deployed of files.

5. The method of claim 4, wherein the modifying the at least one property includes modifying the file extensions of at least a subset of the deployed files, such that at least one of the deployed files in a respective file directory has a different file extension from at least one other of the deployed files in the respective file directory.

6. The method of claim 4, wherein the modifying the at least one property includes modifying the file name each of the deployed files.

7. The method of claim 4, wherein the modifying the at least one property includes modifying at least one of: the file creation time of at least a subset of the deployed files, the file modification time of at least a subset of the deployed files, or a combination thereof.

8. The method of claim 1, wherein the at least one action is selected from the group consisting of: slowing down the process, preventing the process from accessing data items in addition to the at least one of the deployed data items, suspending the process, creating a backup copy of at least a subset of data items sharing a common directory with the at least one of the deployed data items, preventing the deletion of at least a subset of data items sharing a common directory with the at least one of the deployed data items, and a combination thereof.

9. The method of claim 1, further comprising:
   analyzing the process by performing at least one heuristic to determine whether the process is a ransomware process.

10. The method of claim 9, wherein the at least one heuristic is selected from the group consisting of: detecting the process by the signatures of the process, analyzing the permissions requested by the process, determining whether at least one component of the at least one data item is encrypted, analyzing the entropy of the at least one of the deployed data items subsequent to the process writing to the at least one of the deployed data items, analyzing the process to predict the behavior of the process, and a combination thereof.

11. The method of claim 9, wherein the at least one action includes creating a backup copy of at least a subset of data items sharing a common directory path with the at least one of the deployed data items, and deleting the backup copy if the process is determined not to be a ransomware process.

12. The method of claim 9, further comprising:
   causing the taking of a protective action if the process is determined to be a ransomware process.

13. The method of claim 1, wherein each of the deployed data items is deployed such that, each deployed data item is the first data item in the respective file directory for which the ransomware process requests access.

14. The method of claim 1, wherein the protection priority level is further based in part on a priority assigned by a user of the endpoint.

15. The method of claim 1, wherein the protection priority level assigned to the respective file directory and the files in the respective file directory increases with respect to the quantity and frequency of the historical accesses.

16. A computer system for mitigating the effect of a ransomware attack on an endpoint, comprising:
   a non-transitory computer readable storage medium for storing computer components; and
   a hardware processor for executing the computer components comprising:
      a computer module configured for:
         deploying a plurality of data items in a plurality of file directories on the endpoint, each of the deployed data items being hidden from operating system processes executed on the endpoint and including data for baiting a ransomware process to request access to the deployed data items, the deploying based on a protection priority level assigned to the file directories and user files in the file directories, the protection priority level derived from the quantity and frequency of historical accesses, by a user of the endpoint, to the file directories and user files in the file directories, such that, the number of data items deployed in each respective file directory increases with respect to the protection priority level assigned to the respective file directory and the files in the respective file directory;

detecting at least one access event associated with a request by a process to access at least one of the deployed data items on the endpoint; and responding to the detecting of the at least one access event by taking at least one action against the process associated with the detected access event.

17. The computer system of claim 16, wherein each of the deployed data items includes a file, and the computer module is further configured for:

modifying at least one property of each of the deployed files such that, the first file in each respective file directory accessed by a ransomware process during the ransomware attack is one of the deployed of files.

18. The computer system of claim 16, wherein the computer module includes a file system filter driver.

19. A computer usable non-transitory storage medium having a computer program embodied thereon for causing a suitable programmed system to mitigate the effect of a ransomware attack on an endpoint, by performing the following steps when such program is executed on the system, the steps comprising:

deploying a plurality of data items in a plurality of file directories on the endpoint, each of the deployed data items being hidden from operating system processes executed on the endpoint and including data for baiting a ransomware process to request access to the deployed data items, the deploying based on a protection priority level assigned to the file directories and user files in the file directories, the protection priority level derived from the quantity and frequency of historical accesses, by a user of the endpoint, to the file directories and user files in the file directories, such that, the number of data items deployed in each respective file directory increases with respect to the protection priority level assigned to the respective file directory and the files in the respective file directory;

detecting at least one access event associated with a request by a process to access at least one of the deployed data items on the endpoint; and responding to the detecting of the at least one access event by taking at least one action against the process associated with the detected access event.

* * * * *